M. J. HEALY.
APPARATUS FOR DRAWING HOLLOW GLASS CYLINDERS.
APPLICATION FILED MAR. 11, 1909.
1,008,464.
Patented Nov. 14, 1911.
2 SHEETS—SHEET 1.
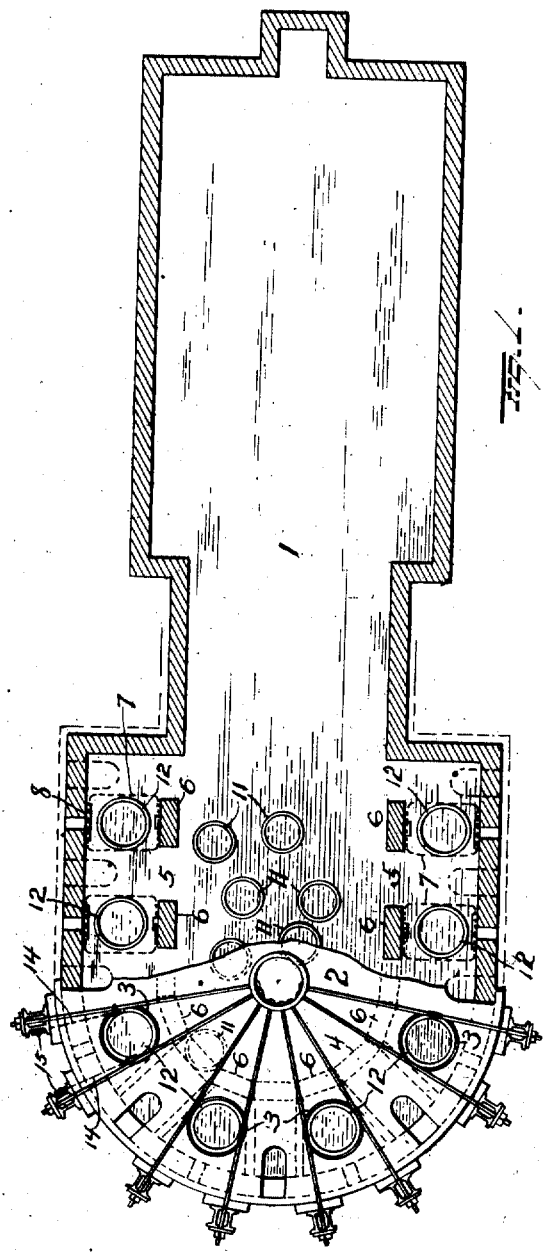
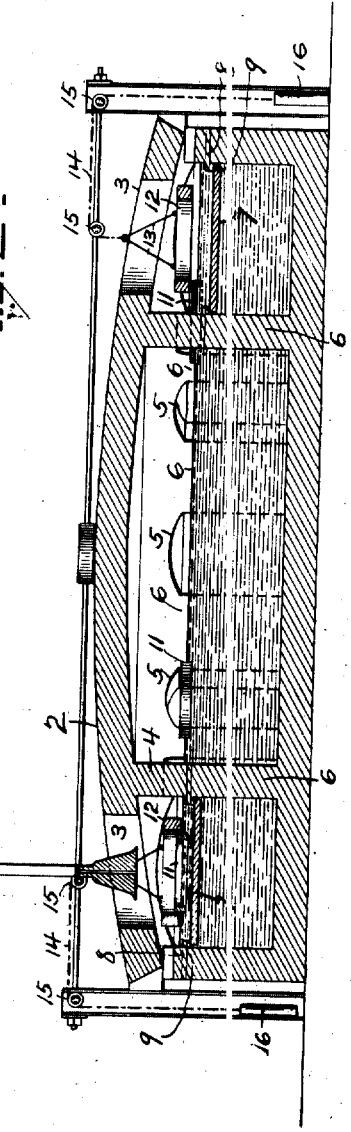

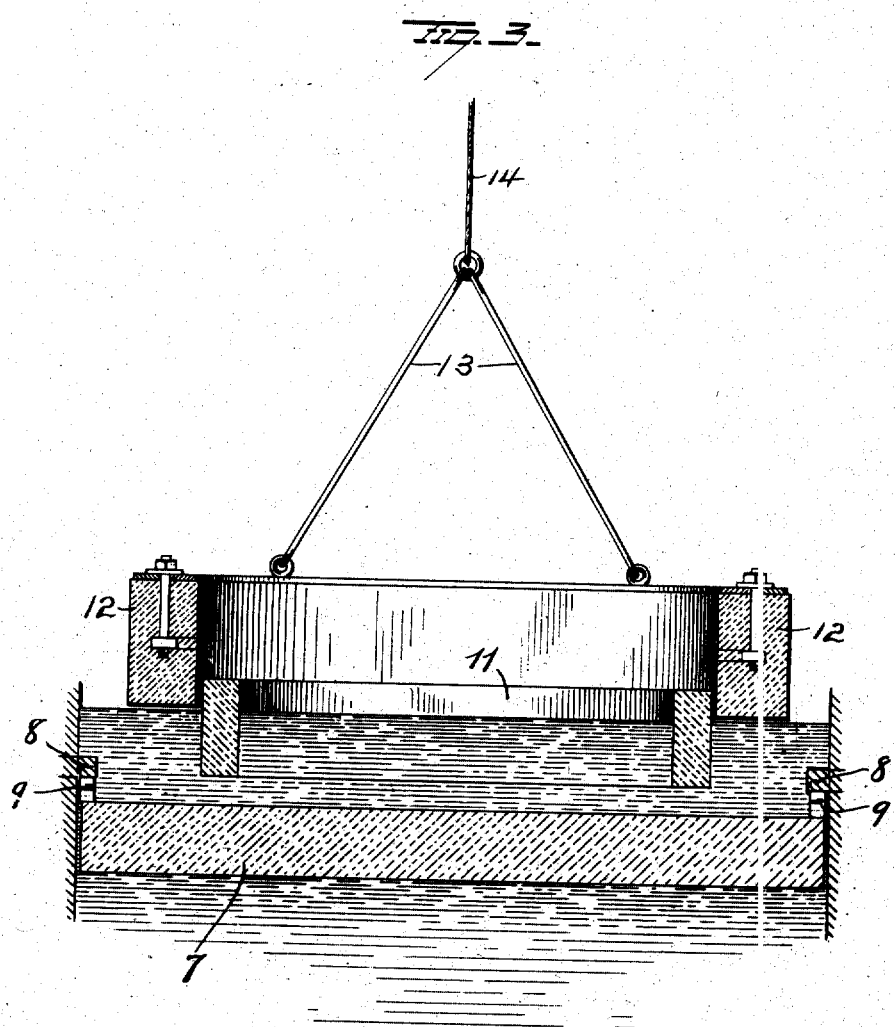

UNITED STATES PATENT OFFICE.

MACK J. HEALY, OF BRADFORD, PENNSYLVANIA.

APPARATUS FOR DRAWING HOLLOW GLASS CYLINDERS.

1,008,464.  Specification of Letters Patent.  Patented Nov. 14, 1911.

Application filed March 11, 1909. Serial No. 482,758.

*To all whom it may concern:*

Be it known that I, MACK J. HEALY, of Bradford, in the county of McKean and State of Pennsylvania, have invented certain new and useful Improvements in Apparatus for Drawing Hollow Glass Cylinders; and I do hereby declare the following to be a full, clear, and exact description of the invention, such as will enable others skilled in the art to which it appertains to make and use the same.

My invention relates to apparatus for drawing hollow glass cylinders, and is designed to provide for chilling the metal at or near the drawing point, thereby enabling me to draw cylinders of even and uniform thickness throughout and comparatively free from impurities and defects.

With these and other ends in view my invention consists in the parts and combination of parts as will be more fully explained and pointed out in the claims.

In the accompanying drawings, Figure 1 is a view in plan partly in section of a glass melting tank; Fig. 2 is a view in section through the working end of same, and Fig. 3 is a view in section of the top ring or shield and the floating ring and the table.

1 represents the glass melting tank of ordinary construction, the cap or crown 2 of which is provided with a series of drawing openings 3 located adjacent to its edge. Located within the tank is the partition or baffle wall 4 parallel with the outer wall of the tank, and provided with a series of arched openings 5, which latter are located intermediate the drawing openings, thus leaving a pier or wall 6 immediately behind each drawing opening.

Located within the tank immediately under each drawing opening 3, is a table or shield 7 made of refractory material of less specific gravity than the molten metal so that the tendency of the table will be to float. These tables are located in the vertical plane of the drawing openings in the tank, and are held submerged in the molten mass within the tank by any preferred means. I have shown the tables or shields resting against wedges 9 supported by the shoulders 8 the under face of which latter are made of refractory material set into the outer wall and piers 6 of the tank, but any other means for holding them submerged may be employed; and if desired the tables or shields may rest directly against the shoulders. With this latter construction the table will automatically maintain its position a predetermined distance below the level of the fluid, irrespective of changes in the depth of the fluid in the tank.

There should always be a free mass of the molten metal above the tables or shields, hence if the level of the mass be lowered for any reason or from any cause, the tables or shields may also be lowered by introducing more refractory wedges between the top of the tables or shields and the shoulders 8. These tables are larger in diameter than the diameter of the floating rings to be hereinafter referred to, so that when in operative position, they permit the free and unrestricted movement of the melted glass over the table, but shield the cylinder being drawn from the intense heat of the mass of molten metal below the table. By this arrangement the cylinder is only exposed from below, to the mass of metal above the table or shield and is protected at its sides by the floating ring 11 and also by the ring shield 12 both of which are shown in Fig. 3. The floating rings 11 are of the ordinary construction and material, and float on the metal in a plane above the tables 7, and are drawn into place by hooked rods operated through holes in the tank. After a cylinder has been drawn, the floating ring 11 with the cooled glass adhering to and remaining in the same, is pushed from under the drawing opening through one of the arched openings into the body of the tank, where the intense heat remelts the glass therein and puts the ring in condition for another drawing. A series of floating rings, usually about three, are provided for each drawing opening, hence after using one, another is ready for use without the loss of any time other than that necessary in placing it in position.

The floating ring is of less diameter than the table, and it is centered and held in position immediately over the table by the ring shield 12. This shield 12 is of a size to embrace the floating ring and prevent the latter from lateral movement when the parts are assembled, and is provided at the sides with two, preferably V-shaped bails 13, each of which is connected at its upper end to a rope or cable 14 passing over pulleys 15, the cables being provided at their lower end with a counterbalance 16. By raising or lowering the two counterweights the shield ring will be raised or lowered to release or embrace the floating ring. By this arrangement the entire space immediately over the drawing opening is left free for unrestricted movements of the blowing apparatus and the movement of the glass cylinder.

With this construction and arrangement of parts it will be seen that while the fluid metal has free and unrestricted flow over the top of the table, the cylinder being drawn is exposed from below to only the heat of the metal above the table and not from the mass below the latter, and when the rings are in place, the cylinder is shielded and protected from the radiated heat at the sides.

By my improvement, I obtain all the advantages incidental to drawing from a pot, without the loss of time and expense of ladling and as the cylinder is drawn directly from the tank, the operation may be continuous.

It is evident that many slight changes might be resorted to in the relative arrangement of parts shown and described without departing from the spirit and scope of my invention hence I would have it understood that I do not wish to confine myself to the exact construction and arrangement of parts shown, but, Having fully described my invention what I claim as new and desire to secure by Letters-Patent, is:—

1. In glass drawing apparatus, the combination with a tank having a drawing opening through its crown or cap plate, of a table or shield within the tank beneath the drawing opening, below the working level of the melted glass and above the bottom of the tank, and a vertically movable ring shield adapted to pass through said drawing opening and supported independently of the cap or crown.

2. In glass drawing apparatus, the combination with a tank having a drawing opening through its crown or cap plate, and a counterbalanced ring shield supported for vertical adjustment independently of the crown plate of the tank and within the drawing opening in the latter, of a submerged table or shield beneath said ring shield and above the bottom of the tank.

3. In glass drawing apparatus the combination of a tank having a drawing opening through its crown or cap plate, a floating ring, and a counterbalanced ring shield supported independently of the crown or cap plate, and adapted to embrace the floating ring and hold same in position beneath the drawing opening.

4. In glass drawing apparatus, the combination with a tank having a drawing opening through its crown or cap plate, a floating ring, and a vertically movable counterbalanced ring shield supported independently of the crown or cap plate, and adapted to embrace the floating ring and hold same in position beneath the drawing opening, of a table or shield located beneath the drawing opening and submerged below the level of the molten glass.

5. In a glass drawing apparatus, the combination with a tank having a drawing opening, a pier in said tank at the rear of the drawing opening, and a table or shield located in the vertical plane of the drawing opening, below the level of the molten glass but above the floor of the tank, and extending from the pier to the outer or breast wall of the tank, of a floating ring in the tank, a counterbalanced ring shield of less diameter than the drawing opening and of greater diameter than the floating ring, and suspension means for the ring shield.

In testimony whereof, I have signed this specification in the presence of two subscribing witnesses.

MACK J. HEALY.

Witnesses:
A. N. MITCHELL,
GEO. F. DOWNING.

---

Copies of this patent may be obtained for five cents each, by addressing the "Commissioner of Patents, Washington, D. C."